United States Patent [19]

Lacour

[11] Patent Number: 4,630,641

[45] Date of Patent: Dec. 23, 1986

[54] PRESSURE-REDUCING APPARATUS

[75] Inventor: Gilbert Lacour, Rueil Malmaison, France

[73] Assignee: Clesse-Mandet, France

[21] Appl. No.: 691,581

[22] Filed: Jan. 15, 1985

[30] Foreign Application Priority Data

Jan. 19, 1984 [FR] France .............................. 84 00819
Dec. 14, 1984 [FR] France .............................. 84 19207

[51] Int. Cl.⁴ ........................................... F16K 35/361
[52] U.S. Cl. ........................... 137/505.38; 137/505.47; 251/61.1
[58] Field of Search ...................... 137/505.38, 505.47; 251/61.1

[56] References Cited

U.S. PATENT DOCUMENTS 3,900,045  8/1975  Murrell ........................ 137/505.38

FOREIGN PATENT DOCUMENTS 528937   8/1956  Canada ........................... 137/505.47
1195982  2/1966  Fed. Rep. of Germany .
2050851  4/1971  France .
2334041  7/1977  France ........................... 137/505.47

*Primary Examiner*—Alan Cohan
*Attorney, Agent, or Firm*—Steinberg & Raskin

[57] ABSTRACT

The present invention relates to an improved pressure-reducing apparatus comprising a casing with a gas inlet and a gas outlet, a cover mounted on the said casing, a manometric membrane clamped between the body and the cover, an adjustment spring for the said membrane and an element projecting from the cover and on which is adapted to bear and pivot the membrane which thus fulfils the function of a lever adapted to directly close the gas inlet into the apparatus.

2 Claims, 13 Drawing Figures

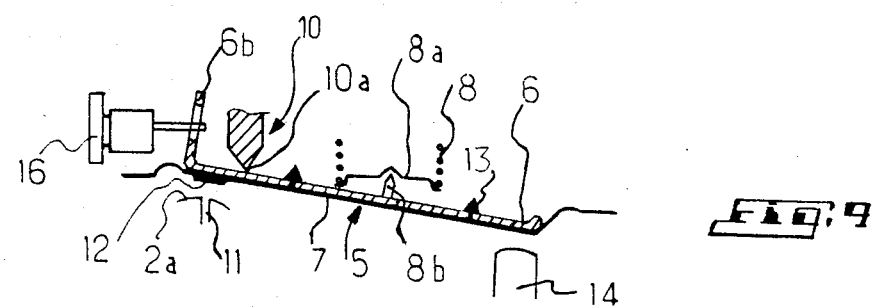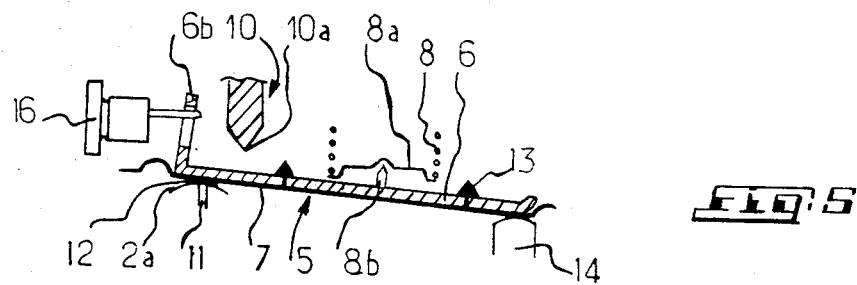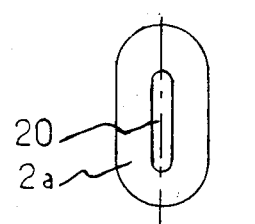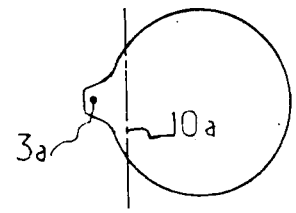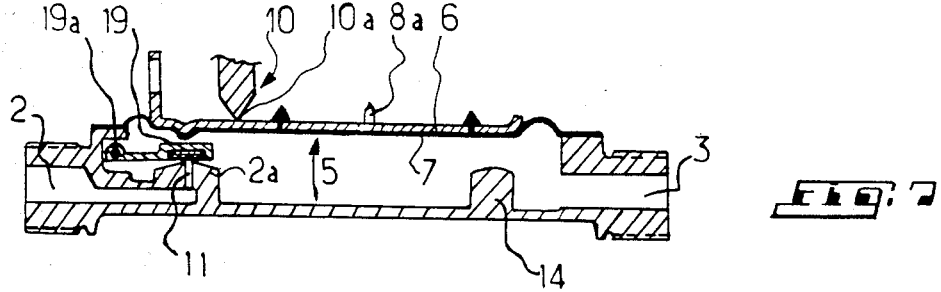

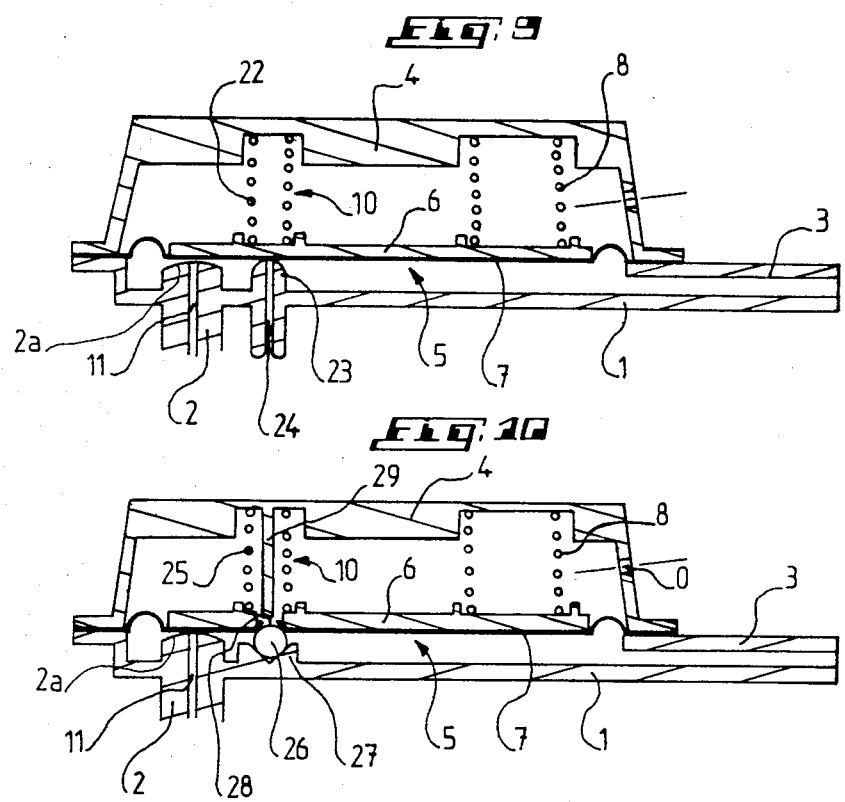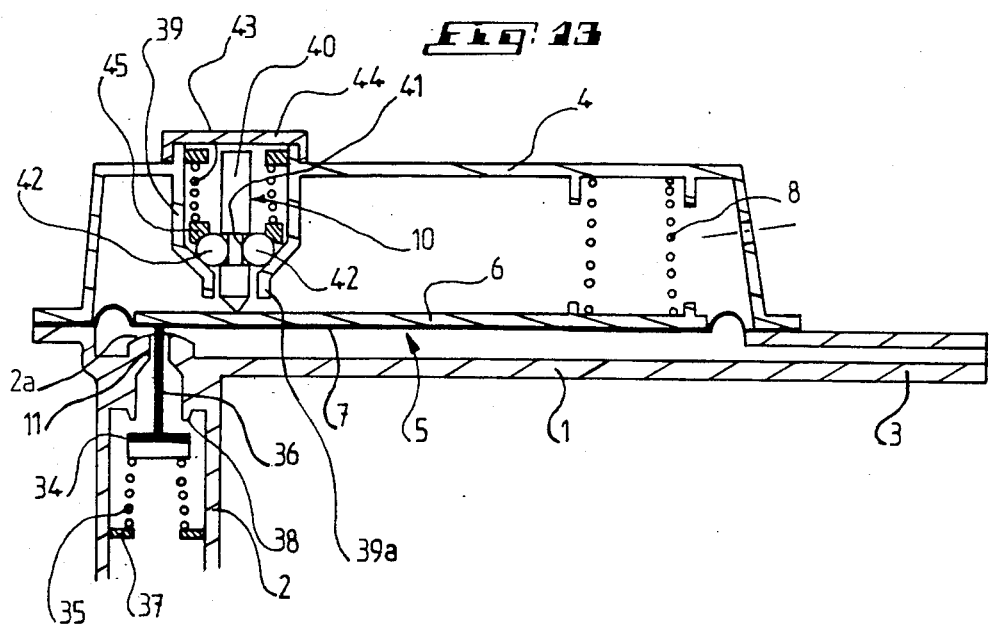

PRESSURE-REDUCING APPARATUS

The present invention has essentially for a subject matter an improved pressure reducer for use in plants for the distribution of compressed or liquefied gas such as town gas, butane gas, propane gas, etc.

Use has already being made, in domestic plants supplied with combustible gas, of pressure reducers of the type including essentially a casing with gas inlet and outlet connections, a cover mounted on the said casing, and a manometric membrane held between the casing and on the cover, and on the two faces of which acts the pressure of the gas to be controlled and an ajustment spring, respectively.

In such pressure reducers, the manometric membrane is ususally coupled to a linkage, a lever or the like adapted to actuate a valve closure opposite a gas inlet port into the pressure reducer casing. Thus, the flow of the gas into the pressure reducer can be cut in case of gas flow cut-off or in case of malfunction.

However, in the known pressure reducers of the above type, the linkage coupled to the membrane and carrying the valve closure increases the number of parts to be provided within the pressure reducer and necessarily increases the difficulties in assembling the apparatus as well as the space occupied thereby, thus sometimes making difficult its mounting on gas conduits which are difficult of access. Also, the mechanical complexity of such pressure reducers makes them expensive and, as can be readily understood, their reliability is the more reduced as the parts which they contain are more numerous.

The present invention has for a purpose to remedy particularly the above drawbacks by providing an improved pressure reducer fulfilling all the desired safety functions, of a particularly simple and therefore inexpensive mechanical design, and offering excellent reliability in operation, owing to the fact that it is no longer provided with a number of parts existing in the conventional pressure reducers.

To this end, the invention has for a subject matter a gas pressure reducing apparatus, of the type including a casing with gas inlet and outlet connections, a cover mounted on the said casing, and a manometric membrane mounted between the casing and the cover and the two faces of which are subjected to the pressure of the gas to be controlled and to the action of an adjustment spring, respectively, the said apparatus being characterized in that it includes at least one element which extends from the cover towards the interior of the apparatus and on which the membrane can bear and pivot, the said membrane thus fulfilling the function of a lever adapted to close preferably directly the gas inlet into the casing of the apparatus.

It is therefore already understood that the essential idea of the invention is based on the fact that it is the membrane which, by pivoting, itself fulfills the function of a valve closure, in contrast to the known pressure reducers where a linkage coupled to the membrane was necessary.

According to another feature of the invention, the position of the said element is such that it divides the membrane into two unequal surfaces, namely, a relatively small surface serving to close the gas inlet into the casing of the apparatus, and a relatively large surface subjected to the action of the adjustment spring.

Thus, when the membrane bears upon the element serving as a pivot, under the action of the gas pressure, there are produced two couples in opposite directions, the couple on the relatively large portion side of the membrane being markedly greater, so that the latter pivots about the said element and closes the gas inlet into the apparatus.

The manometric membrane being, as known per se, constituted by a plate connected with a flexible and deformable membrane, the latter, on the aforesaid relatively small surface side, advantageously constitutes a valve closure adapted to close the gas inlet.

On its relatively small surface side, the manometric membrane can act on a floating or articulated valve closure interposed between it and a gas inlet port into the apparatus.

According to still another feature of the invention, a stop is provided to limit the travel of the manometric membrane, said stop being connected with the casing of the apparatus and located on the relatively large surface side of the membrane.

The casing of the apparatus may also be provided with a second stop, located below the said element and substantially in alignment therewith to prevent the membrane from closing the gas inlet when the apparatus is not under pressure.

According to still another feature of the invention, the plate of the manometric membrane has an upwardly extending edge provided with an opening adapted to cooperate with, for example, an eccentric system to constitute a cock.

According to another feature of the invention the membrane cooperating with the said element cooperates also with means constituting a safety valve in case of an abnormal increase of the gas pressure in the casing of the apparatus.

According to one form of embodiment, the said element is constituted by a spring and the said means are constituted by a stop connected with the casing of the apparatus, located below the spring and substantially aligned therewith on the other side of the membrane, and provided with a bore or the like opening into the said casing, adapted to be closed by the said membrane and communicating with the external atmosphere.

According to another form of embodiment, said element is also constituted by a spring, but the said means are constituted by a ball placed in a recess formed in the casing, located below the spring substantially in alignment therewith on the otherside of the membrane, and adapted to close a hole provided in the said membrane.

Also, a stem or the like connected with the cover extends axially to the said spring and hole.

According to a modified form of embodiment, the said means are constituted by a compensator element coupled to one or several valve closures closing the orifices provided in the membrane by means of springs provided between the latter and the compensator, whereas the said element cooperates with the membrane through the medium of the said compensator.

According to still another modified form of embodiment, said means are constituted by a valve closure with a spring accomodated within the gas inlet connection into the casing of the apparatus and cooperating with the membrane, whereas on the other side of the membrane, the said element is slidingly mounted and retained in a housing or the like connected with the cover of the apparatus.

In this latter case, said element is constituted by a stem provided with a groove cooperating with balls acted upon by a spring.

More specifically, the said housing includes a substantially conical lower portion opposite the membrane and is provided at its top with a cover for access to the housing.

Other features and advantages of the invention will appear more clearly from the following detailed description with reference to the appended drawings given solely by way of example and wherein.

Figure 2:
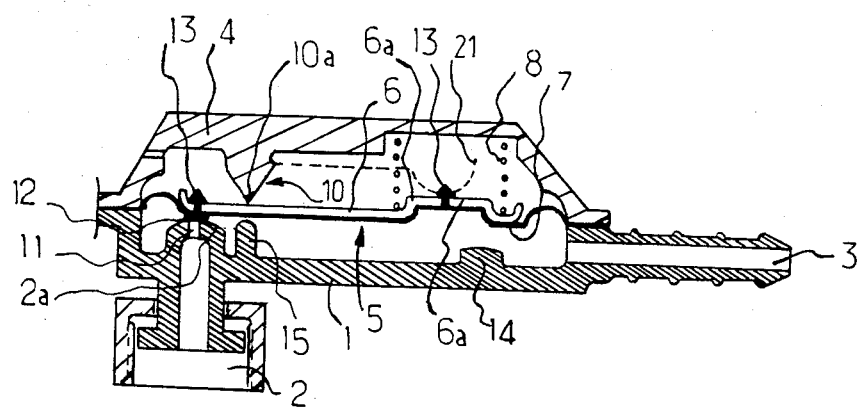
FIG. 2 is a diagrammatic axial sectional view of a pressure reducer according to the invention.

FIGS. 4 and 5 diagrammatically illustrate the membrane of the pressure reducer of FIG. 2 in the open and closed positions of the gas inlet port into the pressure reducer.

FIG. 6 is a diagrammatic top view of an example of embodiment of the manometric membrane.

FIG. 7 is a diagrammatic axial view of still another form of embodiment of the pressure reducer according to the invention.

FIG. 8 is a top view of a particular form of embodiment of the valve seat.

FIGS. 9, 10, 11 and 13 are diagrammatic axial sectional views illustrating four forms of embodiment, respectively, of a pressure reducing apparatus according to the invention and including safety means in case of gas overpressure in the apparatus.

Figure 11:
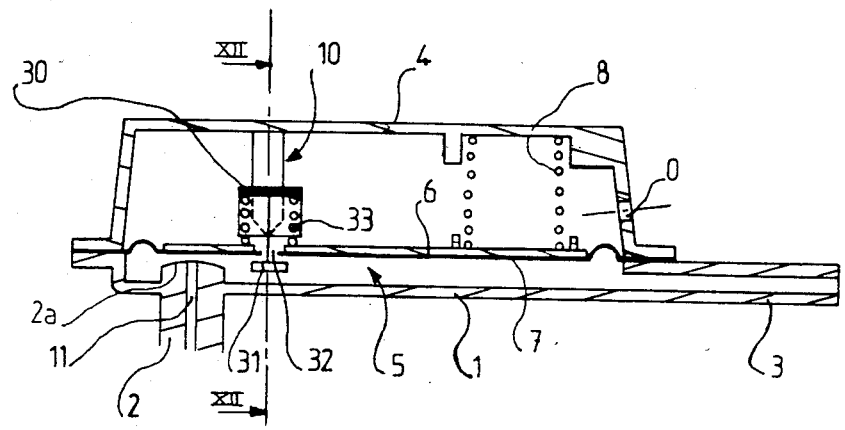
Figure 12:
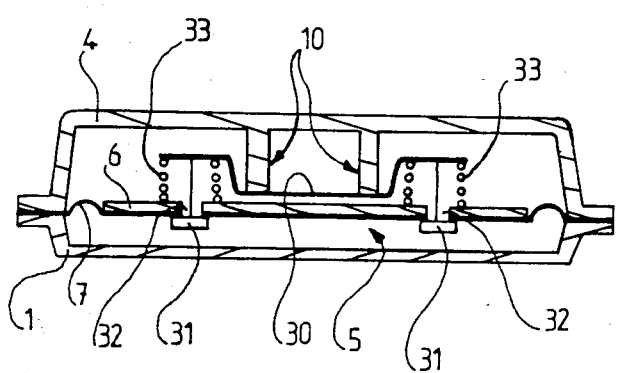

FIG. 12 is a sectional view of the pressure reducer seen in FIG. 11, substantially upon the line XII—XII of this Figure.

Figure 1:
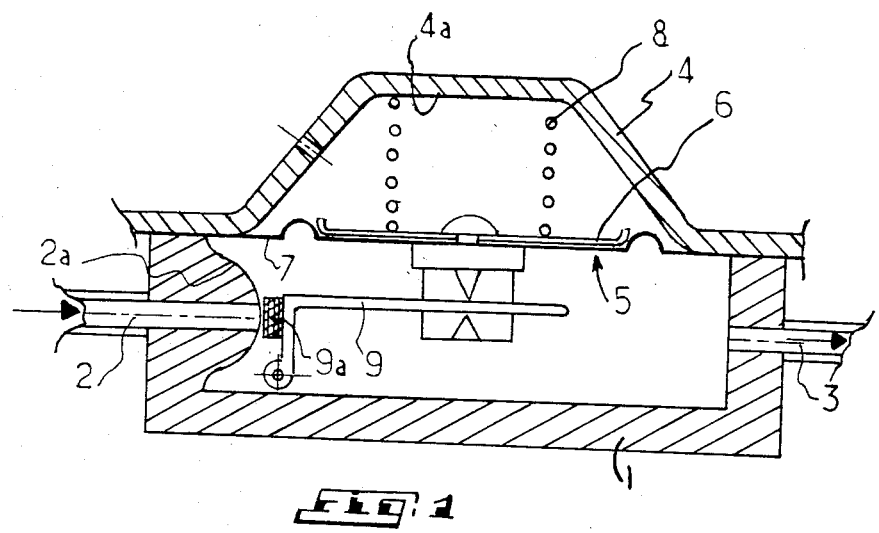
FIG. 1 is a diagrammatic axial sectional view of a pressure reducer of the prior art.

Reference is first made to FIG. 1 in which is diagrammatically shown a pressure reducer of a known type.

It is seen that it includes a casing 1 with a gas inlet connection 2 and a gas outlet connection 3, a cover for mounted onto the casing 1 and manometric membrane 5 constituted by a rigid plate 6 connected with a flexible membrane 7 whose edge is secured between the casing 1 and the cover 4. The lower face of the membrane 5 is subjected to the pressure of the gas to be controlled, whereas the upper face of the said membrane is acted upon by an adjustment spring 8 whose upper end abuts against the bottom 4a of an axial cone provided in the cover 4.

To the membrane 5 is coupled a linkage, lever or the like 9 pivoted to the casing 1 and carrying a valve closure 9a. As is obvious, the valve closure 9a is adapted to stop the inflow of the gas into the pressure reducer by being applied to the seat 2a when the membrane 5 rises, i.e. when the pressure in the pressure reducer increases. In the contrary case, the valve closure 9a moves away from the seat 2a to allow the passage of the gas.

According to the invention, the linkage or lever 9 coupled to the membrane 5 and actuating the valve closure are dispensed with, and it is the membrane itself that fulfils the function of the pivoting valve and lever.

To this end, and according to the example of embodiment illustrated in FIG. 2, there is provided an element 10 projecting towards the interior of the pressure reducer and on which the plate 6 of the membrane 5 can bear and pivot, in such a manner that the membrane fulfils the function of a lever adapted to close the gas inlet port 11 into the apparatus. The element 10, according to the example illustrated, is constituted by one or several teat-shaped protections integral with the cover 4.

The flexible and deformable portion 7 of the membrane 5 can bear directly upon the seat 2a, said flexible portion being possibly provided in that region with a portion of increased thickness constituting a valve closure and shown diagrammatically at 12. But such a portion of increased thickness is in no way indispensable.

The plate 6 is provided with holes allowing it to be connected with flexible membrane 7 through the medium of pins or the like 13.

One of those pins is located in the region of a boss 6a of the plate 6 allowing the centering of the ajustment spring 8, whereas the other pin, as clearly seen in FIG. 2, is located in the region of the valve closure 12.

Reverting to the element 10, it is seen that its position is such that it divides the membrane 5 into two unequal surfaces, i.e., a relatively small surface on the left side of the element 10 and a relatively large surface on the right side of said element.

A stop 14 connected with the casing 1 and located on the relatively large surface side of the membrane 5, below the adjustment spring 8 and substantially in alignment therewith, allows limiting the travel of the membrane 5, especially during the mounting of the apparatus.

At 15 is shown a second stop, also connected with the casing 1 of the apparatus, but located below the element 10 substantially in alignment therewith.

This second stop 15 allows preventing the pressure reducer from being operated under the action of a drop in pressure, i.e., when the membrane 5 is closing the port 11. Otherwise stated, if, after a breakdown, the gas is again put on, the pressure reducer is immediately put in operation. The operation of the pressure reducer illustrated in FIG. 2 will now be briefly explained.

In this Figure, the pressure reducer is shown as being supplied with gas. In the absence of demand for gas at the outlet 3, the gas pressure is exerted under the membrane 5. More precisely, in that case, the plate 6 pivotally bears upon the element or elements 10, so that the valve closure 12 is applied to the seat 2a.

It will be observed that the couple exerted on the right portion of the membrane 5 is markedly greater than the opposing couple exerted on the left portion of the membrane, so that the latter, by pivoting on the free end or edge 10a of the element 10, reliably closes the seat 2a. When a demand for gas takes place at 3, the gas pressure diminishes and, as will be readily understood, the ajustment spring 8 causes the membrane to pivot in the contrary direction and to thus open progressively the gas intake through the port 11.

Lastly, it will be observed that when the apparatus is not under pressure, that is, when no gas under pressure reaches the connection 2, the membrane 5 collapses under the action of the compression spring 8. More precisely, the membrane bears upon the stop 14, as also on the stop 15, thus assuming an inclined position and opening the port 11 associated with the seat 2a. Therefore, if gas is supplied through the connection 2, it can flow through the port 11 and the pressure reducer is again immediately operative to regulate the pressure of the gas feeding the plant.

Figure 3:
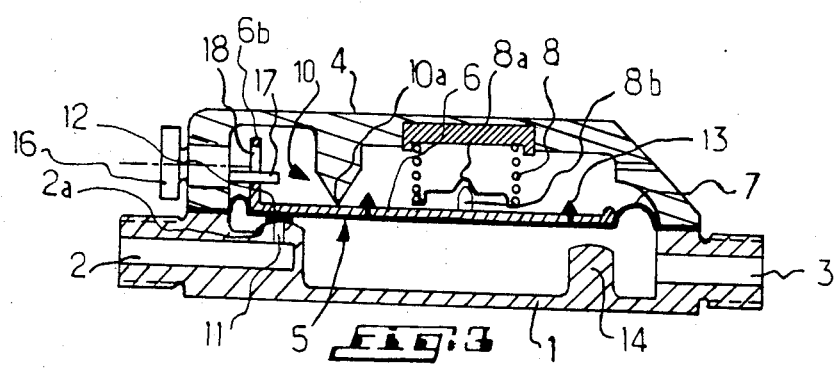
FIG. 3 is an axial sectional view of a modified form of embodiment of the pressure reducer of FIG. 2.

The form of embodiment illustrated in FIG. 3 is designed according to the same principle as that of the pressure reducer of FIG. 2, and the same reference symbols are used to designate the common elements. In this case, however, the stop 15 is dispensed with, for there is provided a cock 16 adapted to positively act upon the membrane 5 to close the seat 2a and also allowing the pressure reducer to be reset subsequent to tripping.

According to a preferred form of embodiment, the cock 16 includes an eccentric 17 movable in an aperture 18 provided in a flange 6b of the plate 6 of the membrane 5, which flange, as seen in FIG. 3, is directed towards the cover 4.

The pressure reducer of FIG. 3 operates in the same manner as that of FIG. 1, and its operation will be described very briefly with particular reference to FIGS. 4 and 5 and starting from the position appearing in FIG. 3 and wherein the cock 16 is shown in the "closed" position, it being understood that a quarter turn of the cock allows freeing the plate 6 of the membrane 5.

When gas is delivered through the apparatus, the membrane 5 assumes the position seen in FIG. 4 by pivoting on the edge 10a of the element 10.

When the gas pressure drops below a predetermined value e.g. as a result of a pressure drop upstream of the pressure reducer or of too large a demand for gas, the membrane collapses under the action of the adjustment spring 8 and bears upon the stop 14 and then separates from the element 10 to finally close the seat 2a, as seen clearly in FIG. 5.

Thus, the apparatus is tripped as a result of a lack of pressure, and it is sufficient, in order to reset it, to turn the cock 16 to the closing position, thus restoring the situation of FIG. 3.

It will be observed that if the seat 2a cannot be closed correctly owing to the inclined position of the membrane seen in FIG. 5, use may be made of a floating intermediate valve closure 19 pivoted at 19a to the apparatus and interposed between the membrane 5 and the seat 2a as seen in FIG. 7, or, alternatively, of a seat 2a of large section provided with an oblong port 20 as seen clearly in FIG. 8. Of course, the pressure reducer may, without departing from the scope of the invention, include either all of such modified embodiments or only any one of them.

As for the membrane used in the various forms of embodiment described and illustrated, its shape may be chosen in such a manner as, for example, to greatly reduce the opposing couple exerted by the pressure at the left of the element 10, this being obtained by reducing the surface of this portion of the membrane, as seen in FIG. 6 illustrating the position of the edge 10a of the element 10, as also of the axis 3a of the seat 2a.

The adjustment spring 8 may bear upon the membrane 5 either directly (FIG. 2) or indirectly through the medium of a small dish-shaped element 8a adapted to pivot on a small pivot pin 8b connected with the plates 6 (FIGS. 2 and 8). The adjustment spring 8 may be replaced quite as well by a resilient strip 21 shown in dotted lines in FIG. 2, the said strip being for example connected with the element 10 and resiliently bearing upon the plate 6 of the membrane 5. Also, and without departing from the scope of the invention the adjustment spring 8 may be replaced by a torsional bar or spring (not shown) arranged in the region of the end 10a of the element 10.

It will also be understood that the respective positions of the seat 2a, the element 10 and the adjustment spring allow varying at will and according to needs the various couples exerted on the membrane as well as the characteristics of the pressure reducer.

Reference is now made to FIGS. 9 to 13 to describe several embodiments of pressure reducers designed according to the principle of the invention and equipped with means constituting a safety valve or relief valve in case of abnormal increase of the gas pressure within the casing of the apparatus.

According to the form of embodiment illustrated in FIG. 9, the element 10 is constituted by a spring 22 arranged between the top wall of the cover 4 and the plate 6 of the membrane 5, which membrane thus resiliently bears upon a stop 23 integral with the casing 1 of the apparatus located below the spring 22 and in alignment therewith on the other side of the membrane 5. The stop 23 is provided with a hole or bore 24 communicating with the external atmosphere and opening into the chamber defined by the casing 1 and the membrane 5. The latter is permanently applied to the stop 23 so that it can oscillate and close the hole 24.

The operation of this form of embodiment will now be described briefly.

In the absence of demand for gas at the outlet 3, the membrane 5 takes its equilibrium position by bearing upon the stop 23, thus closing the gas inlet port 11. If, for some reason or other, a slight leakage subsists at the port 11, the pressure under the membrane 5 increases until it exceeds the force of the compression spring 22. Consequently, the membrane 5 separates from the stop 23 and uncovers the orifice 24, thus allowing the gas overpressure to be discharged to the external atmosphere. It is therefore understood that the stop 23, in cooperating with the membrane 5, fulfils, as it were, the function of a safety valve in case of gas overpressure within the body of the pressure reducer.

According to the example of embodiment illustrated in FIG. 10, the element 10 is, as previously, constituted by a spring 25 arranged between the cover 4 and the plate 6 of the membrane 5. But in this case, there is provided on the other side of the membrane a ball 26 located in a recess 27 formed in the casing 1. The ball 26 is located below spring 25 and substantially in alignment therewith and is adapted to close a hole 28 provided in the said membrane. A stem or the like 29 integral with the cover 4 and projecting towards the interior of the apparatus is arranged along the axis of the spring 25 and of the hole 28 of the membrane 5.

The operation of the apparatus seen in FIG. 10 is as follows.

In the absence of gas delivery, the membrane 5 assumes its position of equilibrium on the ball 26 and closes the gas inlet port 11.

If the gas arriving through the port 11 produces an overpressure, the membrane 5 rises at its point of articulation or pivoting on the ball 24. That is, the hole 28 of the membrane 5 being freed, the gas overpressure is discharged into the upper portion of the pressure reducer to finally escape through the orifice 0 provided in the cover 4. It will be observed that the stem 29 advantageously prevents the ball 26 from following the membrane 5 when the latter rises. It is thus understood that the ball 26, in cooperating with the membrane 5, constitutes a safety valve in case of abnormal overpressure of the gas in the lower chamber of the pressure reducer.

Reference is now made to FIGS. 11 and 12 to describe another modification of the pressure reducing apparatus of the invention.

The means allowing the elimination of any abnormal overpressure of the gas flowing to the pressure reducer are constituted here by a compensator element 30 coupled to two valve closures 31 each closing a corresponding orifice 32 provided in the membrane 5 under the action of springs 33 provided between the latter and the compensator 30. It will be observed that the element 10, which is constituted by two teat-shaped or like projections, as seen in FIG. 12, cooperates with the membrane 5 through the medium of compensator 30. There may quite as well be provided only one or more than two valve closures such as 31, without departing from the scope of the invention. The operation of this apparatus is as follows.

When a gas overpressure occurs under the membrane 5, the latter rises by compressing the springs 23 while the compensator 30 remains applied to the element 10. Consequently, the orifices 32 are cleared by the valve closures 31 and the gas passes through these orifices towards the cover 4 to finally be discharged to the external atmosphere to the orifice seen in FIG. 11.

It will be observed that, as in the foregoing forms of embodiment, the element 10 of the cover 4 divides into two unequal surfaces the membrane 5 on which it bears through the medium of the compensator 30, so that the said membrane fulfils the function of a lever adapted to close directly the gas inlet port 11, as seen clearly in FIG. 11.

Lastly, it will be added that the compensator 30 and its associated valve closures 31 again fulfil here the function of a safety valve in case of overpressure within the pressure reducer.

Reference is lastly made to FIG. 13 to describe another form of embodiment of a pressure reducing apparatus according to the invention.

In this case, the means provided for removing any possible gas overpressure within the pressure reducer are constituted essentially by a valve closure 34 with a spring 25 accommodated within the gas inlet connection 2 opening into the casing 1 of the apparatus. A spring 35 is arranged between a shoulder 37, provided in the connection 2, and the underside of the valve closure 34, whereas the top of this closure is provided with a stem or the like 36 extending through the port 11 and adapted to cooperate at its end with the membrane 5.

The valve closure 34 is adapted to cooperate with a seat 38 provided in the inlet connection 2.

As seen clearly in FIG. 13, the element 10 is mounted slidingly and retained in a housing 39 integral with the cover 4 of the pressure reducer. This element 10 is constituted by a stem 40 provided with a groove 41 cooperating with balls 42 acted upon by a spring 43 along the axis of which extends the stem 40. As seen clearly in FIG. 13, the spring 43 applies the balls 42 in the groove 41 of the stem 40 through the medium of a bearing ring 45.

The housing 39 includes a substantially conical lower portion 39a opposite the membrane 5 and through which the stem 40 projects so that it can bear on the rigid plate 6 of the membrane 5. At its top, the housing 39 in which the element 10 is maintained in position owing to the balls 42, is provided with a cover 44 for access to the internal space of the said housing for the purpose of re-engaging or resetting the pressure reducer in case of abnormal gas overpressure.

The operation of this pressure reducer of the resettable type is described hereafter.

In case of overpressure within the container or body 1 of the pressure reducer, the membrane 5 rises and tends to push the stem 40 upwards. The latter is freed, since, under the action of this pushing force, the balls 42 also are pushed against the force of the spring 43 and are freed from the groove 41. When rising, the membrane 5 which cooperates with the stem 36 of the valve closure 34 frees the said valve closure 34 which, under the action of the spring 35, is applied onto a seat 38 thus closing the gas inlet port 11.

After the removal of the gas overpressure, the apparatus remains in the tripped position, i.e., the valve closure 34 remains in the closing position. In order to reset the apparatus, it is sufficient to withdraw the cover or closure 44 and press down the stem 40 so as to cause its re-engagement with the balls 42.

Of course, the stem 40 may quite as well be arranged to project from the housing 39 to allow the user to himself reset the apparatus, which is not the case when a closure or cover 44 is provided precisely for making necessary the intervention of a specialist.

It is seen that the pressure reducing apparatus of FIG. 13 is different from the other forms of embodiment in that, in this case, there is intentionally provided a safety valve informing the user of the occurrence of an overpressure fault requiring a resetting intervention, which is not the case with the forms of embodiment of FIGS. 9 to 12 wherein the operation of the pressure reducer is automatically restored after the removal of the overpressure fault.

Of course, the invention is by no means limited to the forms of embodiment described and illustrated which have been given by way of example only.

On the contrary, the invention includes all technical equivalents to the means described as well as their combinations should the latter be carried out according to its gist.

What is claimed is:

1. A gas-pressure reducing apparatus comprising a casing having a gas inlet connection and a gas outlet connection, a cover mounted upon said casing, a manometric membrane mounted between the casing and the cover and comprising two faces subjected to the pressure of the gas to be controlled and to the action of an adjustment spring respectively, abutment means extending from said cover towards the interior of the apparatus and onto which the membrane is adapted to bear and pivot, the position of said abutment means being such that it divides the membrane into two unequal surfaces comprising a relatively large surface subjected to the action of said adjustment spring and a relatively small surface adapted to close the gas inlet into the casing of the apparatus, wherein said casing is provided with one stop member extending therefrom and directed towards the membrane at a position located below, and substantially aligned with, said abutment means so as to positively prevent said membrane from closing said gas inlet connection when the membrane is collapsed under the action of said spring within the casing of the apparatus.

2. The apparatus of claim 1, additionally comprising a second stop member located under said relatively large surface of the membrane substantially below said spring.

* * * * *